June 21, 1960 C. R. THOMPSON 2,941,559
FEED FOR FREESTONE FRUIT PITTER
Filed May 8, 1956 4 Sheets-Sheet 1

Inventor
Clarence R. Thompson
by Moore, Prangley & Clayton
Attorneys

June 21, 1960

C. R. THOMPSON 2,941,559

FEED FOR FREESTONE FRUIT PITTER

Filed May 8, 1956

Inventor
Clarence R. Thompson
by Moore, Prangley & Clayton
Attorneys

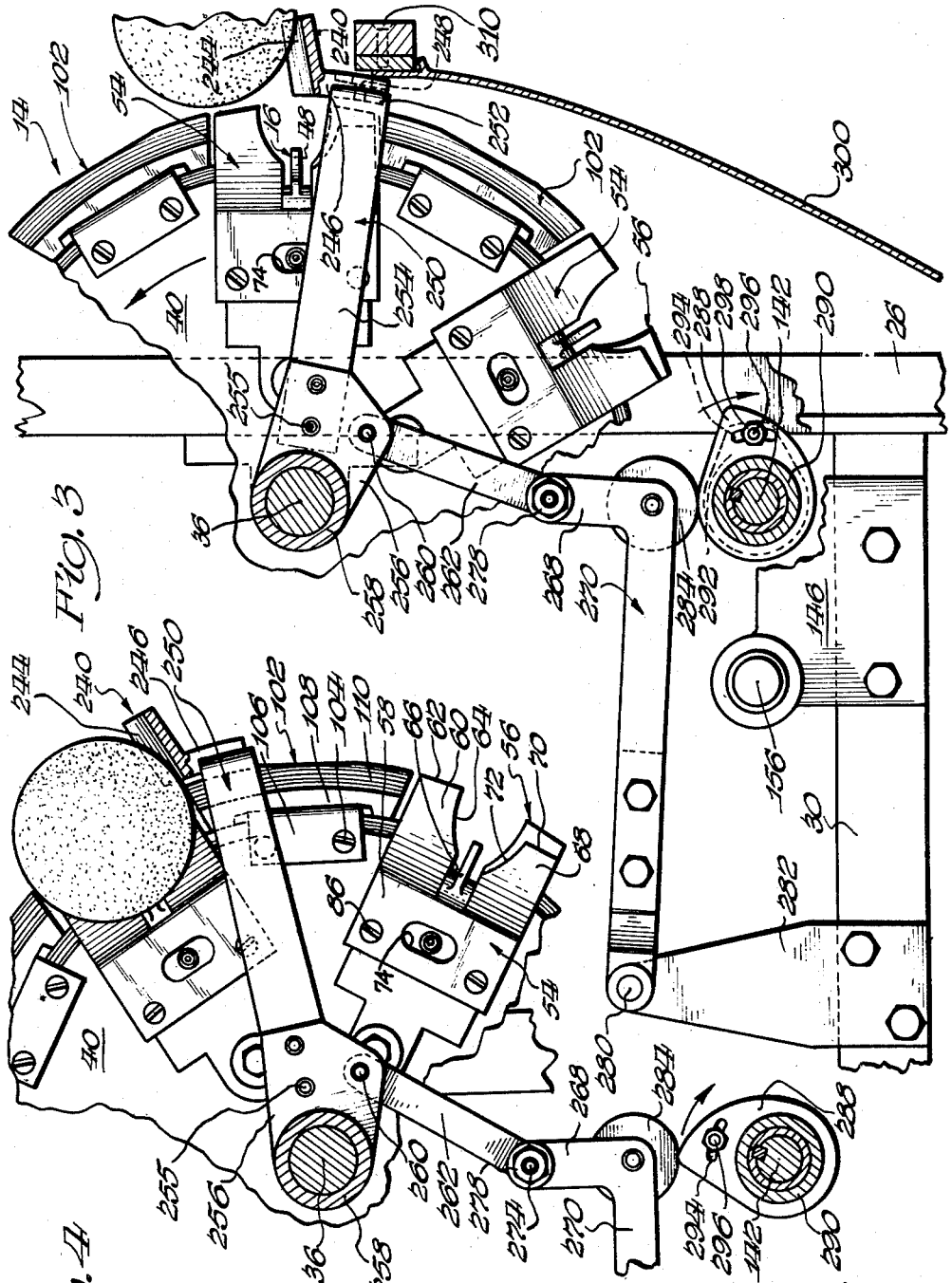

June 21, 1960

C. R. THOMPSON 2,941,559

FEED FOR FREESTONE FRUIT PITTER

Filed May 8, 1956

Inventor
Clarence R. Thompson
by Moore, Prangley & Clayton
Attorneys

United States Patent Office
2,941,559
Patented June 21, 1960

2,941,559

FEED FOR FREESTONE FRUIT PITTER

Clarence R. Thompson, Olympia, Wash., assignor, by mesne assignments, to Food Machinery and Chemical Corporation, San Jose, Calif., a corporation of Delaware Filed May 8, 1956, Ser. No. 583,453

17 Claims. (Cl. 146—28)

This invention relates to fruit preparation machines and particularly to machines for pitting freestone peaches and other fruit having the characteristic of easy separability of the fruit flesh from the pit possessed by freestone peaches such for example as apricots and Italian prunes.

The improvements of this invention are adapted to be incorporated in machines of the type wherein the fruit is impaled upon fruit dividing means mounted upon a conveyor, carrier or turret. The fruit dividing means scores or severs the fruit inwardly from one end or side thereof and partially around the pit as the fruit is placed on the carrier, the carrier conveying the impaled fruit to other fruit dividing means which scores or severs the flesh of the fruit inwardly from the opposite end or side of the fruit. One of the dividing means then operates to spread the divided fruit halves and discharge the fruit halves from the pit which is retained on the carrier for subsequent discharge therefrom.

In machines of the type set forth above, the fruit is impaled manually upon the carrier and this operation brings the hand of the operator into close proximity to the flesh severing and dividing apparatus of the machine. Safety to the hands of the operator is therefore a serious problem in machines of this type.

Machines of the type set forth above operate most effectively and efficiently when the fruit is carefully aligned with respect to the carrier. More specifically the suture plane must be aligned with the fruit dividing means and the stem indent of the fruit should be directed squarely into the pit retaining member so that the pit is firmly engaged and retained.

These machines are inherently high capacity machines and it has been difficult heretofore to feed fruit properly to the machines at a rate such as to utilize the full capacity of the machines. Even skilled and earnest workers have experienced difficulty in feeding the machines at the maximum rate of operation thereof.

Accordingly, it is an important object of the present invention to provide an improved machine for pitting freestone peaches and the like of the type set forth; more particularly it is an important object of the invention to provide a machine of the type set forth which can be more easily and more rapidly supplied with fruit to be pitted thereby.

Another object of the invention is to provide a machine of the type set forth including means to aid in feeding fruit thereto at a high rate whereby to utilize the full capacity of the machine.

Yet another object of the invention is to provide a machine of the type set forth in which fruit can be fed thereto more rapidly and more accurately.

Still another object of the invention is to provide an attachment for machines of the type set forth which aids in aligning fruit to be fed to the machine with respect to the fruit dividing members so that equal size fruit halves are produced by the machine.

Yet another object of the invention is to provide an attachment for machines of the type set forth which aids in rapid and safe aligning of the pit prior to feeding of the fruit onto the machine whereby the pit is more firmly and is always properly seated in the pit retaining member.

A further object of the invention is to provide an attachment for machines of the type set forth which provides a definite time to feed the fruit onto the carrier.

Still a further object of the invention is to provide a machine and an attachment therefor of the type set forth which permits a less skilled operator to feed fruit to the machine at a high rate and still obtain a high quality product.

These and other objects and advantages of the invention will be better understood from the following description when taken in conjunction with the accompanying drawings. In the drawings wherein like reference numerals have been utilized to designate like parts throughout:

Figure 3 is a fragmentary view substantially as seen in the direction of the arrows along the line 3—3 of Figure 2 and illustrating the construction and drive for the fruit support or feed guide attachment;

Figure 4 is a partial view similar to Figure 3 and illustrating another position of the feed guide attachment;

The pitting machine of this invention is similar in construction and operation to and is an improvement upon the machine illustrated and described in Patent 2,704,561 granted March 22, 1955 and upon the machine illustrated and described in the co-pending application, Serial No. 476,899, filed December 22, 1954, now Patent No. 2,868,251, for "Freestone Pitter."

Figure 1:
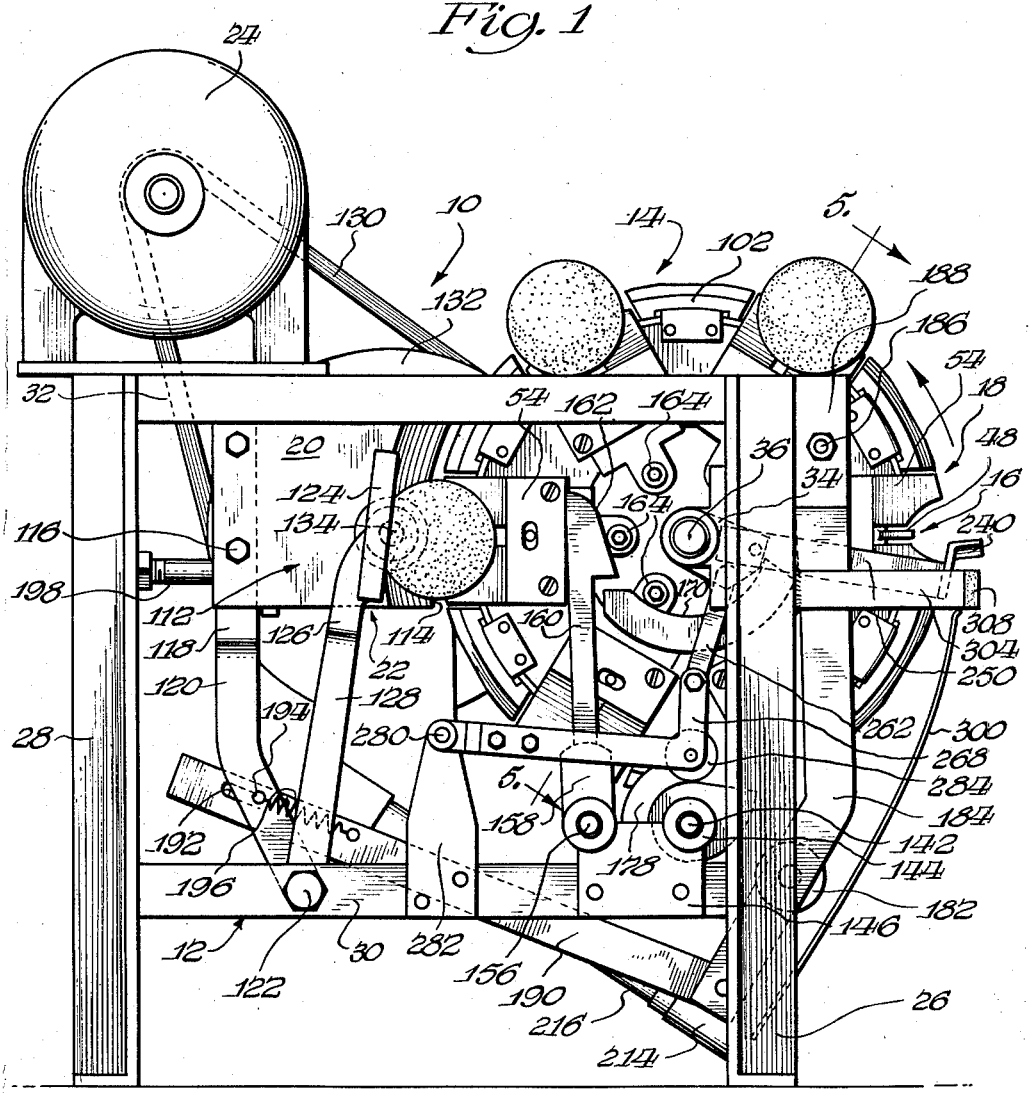
Figure 1 is a side view in elevation of a machine made in accordance with and embodying the principles of the present invention.

There is shown in Figure 1 of the drawings a preferred embodiment of a machine, generally designated by the numeral 10, made in accordance with and embodying the principles of the present invention. Machine 10 comprises a frame 12 upon which is rotatably mounted a fruit carrier, conveyor, or turret 14 which has mounted thereon a plurality of pit pockets and pit retaining devices 16 and a plurality of combined fruit flesh severing and spreading units 18. A second fruit severing member 20 is also provided and a fruit pressing or holding member 22. Motive power for the various operating portions of the machine is provided by a motor 24 mounted upon frame 12.

Figure 5:
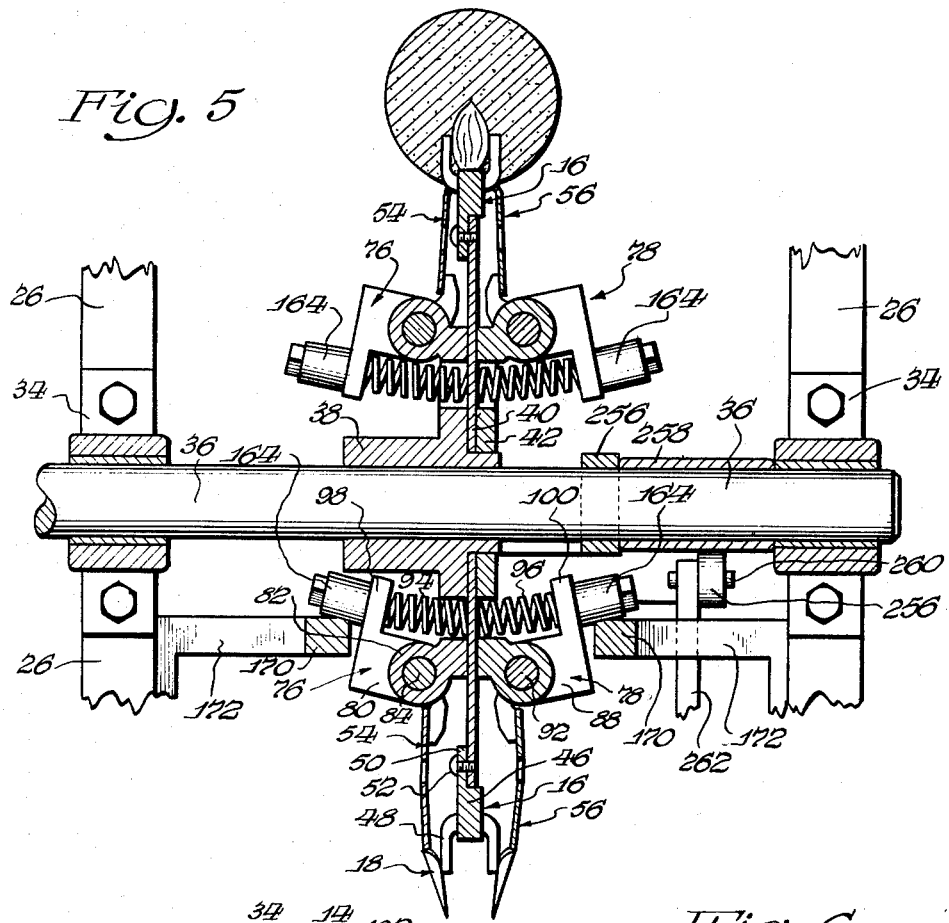
Figure 5 is a partial enlarged view in vertical section substantially as seen in the direction of the arrows along the line 5—5 of Figure 1.

Frame 12 more particularly includes a pair of front angle iron legs 26 and a pair of rear angle iron legs 28 which are connected near the lower ends by a pair of lower side bars 30 and at the upper ends by a pair of upper side bars 32. The various legs and side bars are suitably interconnected as by bolts or welding. A pair of bearing members 34 is bolted to the front legs 26 and receive a shaft 36 upon which is supported the carrier 14. Referring more specifically to Figure 5 it is seen that hub 38 is fixedly mounted upon shaft 36 and has attached thereto a disc or plate 40 which is held thereon by a member 42.

The plate or disc 40 of carrier 16 is provided with a plurality of recesses or openings on the periphery thereof, preferably six equidistantly spaced recesses being provided around the periphery thereof. The pit retaining devices 16 are mounted within the pit pockets or recesses in disc 40 and each includes a body 46 from which extend outwardly a pair of pit prongs 48 (see particularly Figure 5). Each prong 48 is elliptical in cross section at its junction with body 46 and tapers toward the free end which is circular in cross section and is cut off square. The prongs on each body 46 extend laterally therefrom and radially therefrom with the outer ends of prongs 48 disposed substantially parallel. Body 46 has a rearwardly extending plate 50 which extends over the conveyor disc 40 and is attached thereto by a screw 52. Preferably the pit engaging member 16 is formed integral and the preferred material of construction is cast stainless steel.

A combined fruit severing and spreading means 18 is provided in each of the recesses around disc 40. Each of the fruit severing and spreading means includes a pair of cutting and spreading blades 54 and 56 (see Figures 4 and 5). Blade 54 includes a mounting portion 58 which has attached thereto by an offset portion a first and longer cutting blade 60 which has a curved and sharpened outwardly directed edge 62. A second sharpened and concavely curved cutting edge 64 is formed on cutting blade 60 and terminates in a rearwardly extending U-shaped notch 66. A second forwardly extending offset cutting blade 68 is provided, cutting blade 68 being substantially shorter than cutting blade 60. The forward cutting edge 70 of blade 68 is sharpened and a concavely curving cutting edge 72 is formed on blade 68 and runs from cutting edge 70 to the notch 66. The mounting portion 58 has formed therein an elongated access aperture 74 which permits access to the screw 52 which holds the pit retaining member 16 in position. The combined fruit severing and spreader blade 56 is formed identically to blade 54 and therefore will not be described in detail. Where appropriate, like reference numerals have been applied.

A bracket 76 is provided for mounting blade 54 and a similar bracket 78 is provided for mounting blade 56. Bracket 76 includes a pair of inwardly extending legs 80 which are apertured and are disposed in the assembled position on either side of a part-circular embossment 82 formed on the periphery of hub 38. Six embossments 82 are provided around the periphery of hub 38 whereby to accommodate six blades 54. A pin 84 serves pivotally to interconnect bracket 76 and apertured embossment 82. A pair of screws 86 extend through apertures in blade 54 and engage threaded apertures in bracket 76 thereby interconnecting blade 54 and bracket 76.

Bracket 78 includes a pair of inwardly extending legs 88 which are apertured and adapted to cooperate with an apertured part-circular embossment 90 formed on the periphery of plate 42. A pin 92 pivotally interconnects bracket 78 and embossment 90. A pair of screws similar to screws 86 extends through apertures in blade 56 to secure the blade to bracket 78. Blades 54 and 56 are maintained in the position indicated in Figures 4 and 5 of the drawings by spring 94 and 96, respectively (see Figure 5). Spring 94 is under compression and is confined between arm 98 on bracket 76 and disc 40. Spring 96 similarly is under compression and is held between an arm 100 on bracket 78 and plate 40. Springs 94 and 96 normally urge arms 98 and 100 of brackets 76 and 78 outwardly away from disc 40 thereby urging the forward sharpened ends of blades 54 and 56 together and into touching relationship. Since blades 68 are shorter than blades 60, a single cutting edge is provided to make the initial incision in the skin of the fruit as it is pushed upon the combined fruit severing and spreader blades 54 and 56. This construction prevents bruising of the forward end of the fruit, i.e., the part of the fruit first presented toward the carrier 22, and the cut face of the fruit is likewise free from bruising because of the gentle insertion of the blade therein.

Spreading of the fruit flesh from the pit is accomplished by pivoting brackets 76 and 78 in such a manner as to spread the sharpened ends of blades 54 and 56 away from each other while the fruit pit is held between the pit engaging prongs 48. The construction and operation of the mechanism to perform this operating of blades 54 and 56 will be described more fully hereinafter.

The spaces between adjacent sets of severing and spreader blades 18 are filled with wings or guards or rim segments 102 which are suitably secured to the disc 40 by a pair of screws 104. Each guard 102 includes an attachment flange 106 which receives the screws 104 therethrough and has formed thereon an offset flange which terminates in a substantially U-shaped guard portion 108. Guard portion 108 is bevelled as at 110 but the outermost edge is square or blunted whereby contact of this edge with the hand of an operator will not cause injury thereto. Guard portion 108 is positioned in line with disc 40 so that guard portion 108 forms in essence a continuation of disc 40. The outermost edge of guard portion 108 lies even with and forms a continuation of the sharpened outer ends 62 of spreader blades 54 and 56. By providing the guard members 102, the fingers of an operator are guided away from the sharpened edges of the spreader blades 54 and 56.

The sharpened edges 62, 64, 70 and 72 on the spreader blades 54 and 56 serve to sever the skin of the fruit substantially half way around the circumference thereof and further cut the flesh down to the pit and along substantially the length of the pit. The remaining circumference of the skin and the portion of the flesh positioned between the pit and the blossom end of the fruit is cut by the second fruit flesh severing or scoring member 20 which includes a blade 112 having a bevelled and sharpened edge 114 (see Figure 1). The sharpened edge 114 of blade 112 is concavely curved and has a radius substantially equal to the radius of the cutting edges 62 on the spreader blades 54 and 56 so that blade 112 almost reaches and meets the cutting edges 62 when blade 112 is in the deepest cutting position.

Blade 112 is periodically swung inwardly to sever a fruit positioned on disc 40 and to this end blade 112 is fastened as by bolts 116 to an arm 118 provided at the lower end with a pair of arms 120 which are pivoted to frame members 30 by bolts 122. This mounting permits blade 112 to be swung toward and away from disc 40, knife 112 scoring and severing the flesh of fruit positioned upon disc 40 when knife 112 is moved forwardly to the right as viewed in Figure 1.

The fruit retaining, pressing or holding means 22 comprises a pair of presser pads 124 (see Figures 1 and 6), one pad being positioned on one side of knife 112 and the other pad being positioned on the other side of knife 112. Pads 124 are positioned upon arms 126 of a yoke 128 which is also pivoted on frame members 30 by bolt 122. The purpose of pads 124 is to press the fruit against the cutting edges of spreader blades 54 and 56 whereby to finish cutting and severing the flesh if the fruit has not been urged to the fullest seated position by the operator. The presser pads 124 also serve to hold the fruit against spreader blades 54 and 56 during the spreading operation when the flesh is being torn away from the pit.

Figure 2:
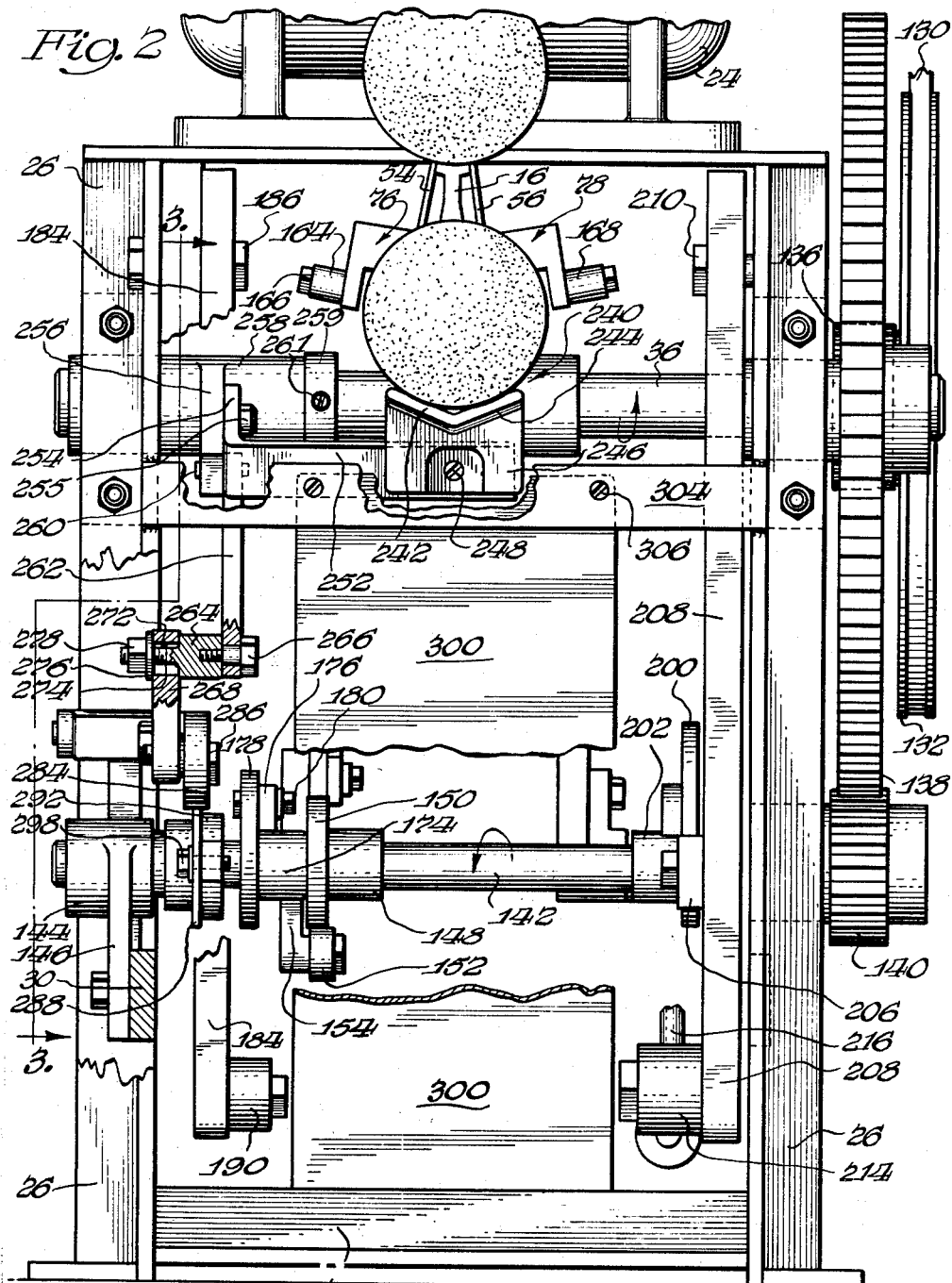
Figure 2 is an enlarged view with certain parts broken away of the front or feed end of the machine illustrated in Figure 1 of the drawings.

Power to drive the various moving parts is provided by the motor 24 which preferably is an electric motor which is secured to the frame 12 by any suitable means such as by bolts. Motor 24 is provided with a suitable set of internal speed reducing gears and the output from the speed reducing gears appears on a shaft provided with a pulley. A belt 130 engages the pulley on the output of motor 24 and in turn drives a larger pulley 132 which is mounted upon a shaft 134 (see Figure 1) which also carries a small gear 136 (see Figure 2). Gear 136 meshes with a large gear 138 mounted upon and drivingly connected to shaft 36 upon which is mounted conveyor 14. Motor 24 through belt 130, pulley 132 and gears 136 and 138 thereby serves to turn shaft 36 and all parts mounted thereon including disc 40. Preferably shaft 36 and disc 40 are rotated in a continuous and uninterrupted manner and to this end the motor 24 is designed to operate continuously while the machine 10 is in operation.

Gear 138 also meshes with a gear 140 fixedly mounted upon a shaft 142 mounted upon frame 30 and more specifically upon bushings 144 carried by a plate 146 mounted upon frame members 30. Mounted upon shaft 142 are various timing cams which serve to effect operation of the various moving parts of the machine in proper timed relationship.

The opening or spreading movement of the spreader blades 54 and 56 is operatively controlled from cam shaft 142. More specifically there is mounted on cam shaft 142 a hub 148 which is provided with a cam member 150 adjustably mounted thereon. Cam 150 has the cam surface thereof engaged by a cam roller 152 rotatably mounted upon an arm 154 keyed to a shaft 156 (see Figure 1). Formed integral with arm 154 is a second angularly disposed arm 158 which has adjustably attached thereto a support arm 160 which carries a cam surface 162. Cam surface 162 is adapted to be contacted by a roller 164 mounted upon a stud 166 threadedly engaged in bracket 76. A similar cam 162 and a roller 168 is provided for bracket 78, the second cam surface 162 being carried by an arm pivoted upon the same shaft 156 that carries arm 160, the two support arms being adapted to be moved in unison. Contact of the rollers 164 and 168 with the respective cam surfaces 162 spreads blades 54 and 56 by pivoting brackets 76 and 78 about pins 84 and 92 against the action of springs 94 and 96.

The major portion of the cam surfaces 162 is curved. Due to this construction the spreader blades 54 and 56 once spread are maintained in the spread relationship and in addition later contact a cam surface 170 (see Figure 1) having a part-circular surface concentric with the center of shaft 36 and forming a continuation of the cam surfaces 162. The cam surfaces 170 are mounted upon brackets 172 suitably fastened as by bolts to the legs 26 (see Figure 5). By this construction the spreader blades 54 and 56 can be opened as the conveyor 14 continues to revolve without interruption and the spreader blades are maintained in the opened position during a substantial portion of the angular movement of the conveyor 14, preferably through an angle of approximately 120°. Upon leaving the right hand end of cam surfaces 170 as viewed in Figure 1, the spreader blades 54 and 56 are returned to the closed position under the action of springs 94 and 96. The spreader blades are now in position to receive another fruit.

Also mounted upon cam shaft 142 is a second hub 174 which is keyed thereto and has formed thereon an integral arm 176. A cam 178 is mounted on hub 174 and is adjustably secured thereto by a bolt 180 passing through a slot in arm 176. Cam 178 engages a cam roller 182 (see Figure 1) rotatably mounted upon an arm 184 which is in turn pivotally mounted as at 186 on a plate 188 mounted on the front legs 26. The lower end of arm 184 is movable upon contact of the roller 182 with cam 178. The lower end of arm 184 has pivotally attached thereto a link 190, link 190 being provided at its other end with an elongated slot 192 which receives a pin 194 fixedly attached to the yoke 120 which supports blade 112. The slot 192 and pin 194 form a lost motion mechanism and the pin is held in operative position by a spring 196 interconnecting link 190 and yoke 120. Cam 178 acting against roller 182 is operative to move knife 112 and associated parts toward and away from fruit carried on the conveyor 14. Blade 112 during the fruit severing movement thereof is driven to the right as viewed in Figure 1 until it hits a pit or until it engages a stop 198 mounted on leg 28.

Figure 6:
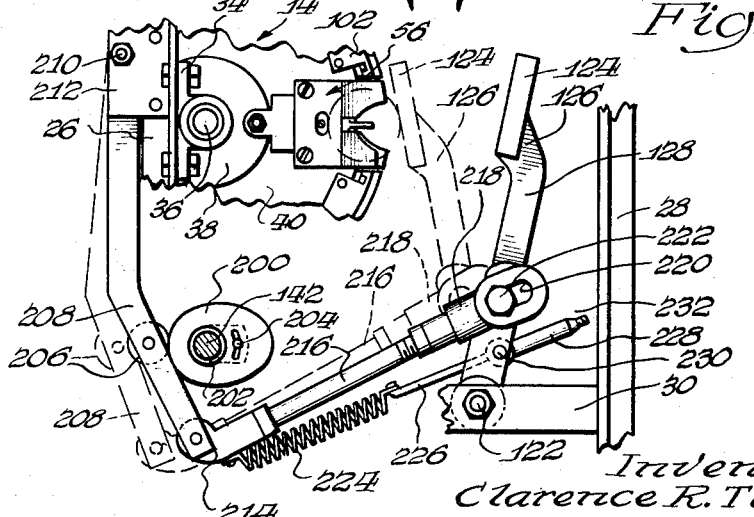
Figure 6 is a view showing the mounting and actuating mechanism for the presser pad forming a part of the pitting machine.

The presser pads 124 (see Figures 1 and 6) are actuated by a cam 200 which is also mounted upon the cam shaft 142. More specifically there is fixedly attached to cam shaft 142 a hub 202 which mounts and supports the cam 200 by means of a bolt 204 passing through a slot in hub 202 to provide adjustability of cam 200 with respect to shaft 142. Cam 200 acts against a roller 206 mounted upon an arm 208 pivoted at point 210 to a plate 212 attached to the frame 12. The action of cam 200 against roller 206 moves arm 208 and the associated parts from the solid line position to the dotted line position as seen in Figure 6 whereby to move the presser pads 124 against a fruit positioned on conveyor 14. Interconnection is made between arm 208 and the presser pads 124 by means of a link 214 pivoted to the lower end of arm 208 and connected by a rod 216 adjustably and threadedly received thereby and adjustably and threadedly attached to a second link 218. Link 218 is provided with an elongated slot 220 which receives a pivot stud 222 adjustably threaded into one of the arms of yoke 128. A coil spring 224 has one end attached to link 214 and the other end to a rod 226 slidably received in a sleeve 228 pivotally attached to yoke 128 by means of a pivot stud 230. Wing nut 232 threadedly engages the end of rod 226 extending beyond sleeve 228 whereby to permit adjustment of the tension in spring 224. Spring 224 and its associated parts govern the lost motion connection provided by slot 220 and the pivot pin 222 to hold the pin normally in the position shown in full lines in Figure 6. Rotation of cam 200 acting against roller 206 pivotally moves the various parts to the dotted line always thereby urging the presser pads 124 against the butt or blossom end of peaches provided on the carrier 14. This action assures that the peaches on the carrier are held thereon under a sufficient but not excessive force while the spreader blades 54 and 56 are moving upwardly away from each other to separate the fruit flesh from the pit.

Means is provided to assist the operator in properly orienting, positioning and feeding the fruit to the conveyor 14. To this end a fruit support or feed cup 240 has been provided. Fruit cup 240 includes a pair of support members 242 and 244 which are arranged in a shallow V-shape as can be best seen in Figure 2 of the drawings. In the rest position illustrated in Figures 1 and 3 of the drawings fruit support 240 is in general horizontal alignment with the center of shaft 36. The junction between support members 242 and 244 lies in the plane of disc 40 and is inclined downwardly in the rest position of fruit support 240 whereby fruit positioned thereon is urged toward disc 40 by gravity. Depending downwardly and at an obtuse angle with respect to support members 242 and 244 is an attachment plate 246. Plate 246 is provided with an opening which receives a screw 248 to attach fruit cup 240 to a bar 250. More specifically bar 250 is L-shaped to provide a transversely extending strap 252 which receives screw 248 and a rearwardly extending bar 254. The rear end of bar 254 is suitably attached as by screws 255 to a plate 256 which is in turn attached to a hub 258 supported by and pivotal about shaft 36. The position of hub 258 longitudinally upon shaft 36 is maintained by a collar 259 fixedly positioned upon shaft 36 by a set screw 261.

It is desirable to move fruit support 240 and the support strap 250 arcuately upwardly in synchronism with movement of the conveyor 14 and to this end a suitable drive mechanism has been provided. More specifically there is pivotally attached to plate 256 by means of a stud 260 a link 262. The other end of link 262 is pivotally attached to a spacer stud 264 by means of a stud 266. Spacer stud 264 is in turn adjustably attached to one arm 268 of an L-shaped lever 270. More specifically arm 268 is provided with an elongated slot 272 through which passes a threaded stud 274. The threaded outer end of stud 274 receives a washer 276 and a nut 278 which attach spacer stud 264 to arm 268. The other end of lever 270 is pivotally connected as at 280 to a plate 282 which is connected to and extends upwardly from frame member 30. The slot 272 permits adjustment of the linkage to accommodate different sizes of fruit. More specifically for larger fruit it is desired to lower fruit support 240 and for smaller fruit it is necessary to raise the rest position of fruit support 240.

Mounted at the junction between arm 268 and lever 270 is a rotatable cam follower 284 which is held thereon by a stud 286. Cam follower 284 engages a cam 288 which is mounted upon cam shaft 142. More specifically a hub 290 is fixedly mounted upon shaft 142 and has extending outwardly therefrom a plate 292. Formed in plate 292 is an arcuate elongated slot 294 which receives a bolt 296 which also passes through cam 288. A nut 298 engages bolt 296 to lock cam 288 in any desired adjusted position with respect to shaft 142.

The shape of cam 288 is such as to lift the fruit support 240 upwardly in synchronism with rotation of conveyor 14. More specifically when a pair of spreader blades 54 and 56 arrive opposite and in line with a fruit positioned upon support 240, support 240 is moved radially upwardly at the same rate as conveyor 14. This construction permits an operator to rest the fruit upon support 240 and orient and align the fruit properly with respect to the spreader blades 54 and 56. More specifically the provision of support 240 permits the operator to align the suture plane accurately with respect to the spreader blades thereby achieving equal size fruit halves and also accurately align the pit and the stem indent with the pit retainer prongs 48. Vertical adjustment is automatically achieved since the fruit support 240 moves upwardly in exact synchronism with conveyor 14.

It has been found that satisfactory operation is obtained if fruit support 240 moves angularly upwardly approximately through an angle of 20° in synchronism with disc 40. Cam 288 is so shaped as to return fruit support 240 to the lower or rest position during approximately the next 10° of rotation of disc 40 and the fruit support 240 remains in the rest position fo ra period of equal to approximately 30° rotation of disc 40. Since the pit pockets are disposed 60° apart, another pocket is presented in alignment with fruit support 240 at the end of the rest period. It is to be understood that relative proportions of rest, return and feed movement given above can be varied if desired.

A front safety guard 300 is provided on the front of machine 10 and extends upwardly from a lower cross support 302 (see Figure 2) to a U-shaped support bar 304 which is mounted and suitably attached to the front legs 26. A pair of screws 306 mount the upper end of guard 300 on bar 304. Also mounted on bar 304 is bumper 308 held thereon by a screw 310 (see Figure 3). Bumper 308 protects the feed cup 240 from damage should an object hit the machine in that area.

The operation of machine 10 will now be described in detail through an entire cycle of operation. The electric motor 24 is first energized whereby to drive the conveyor 14 in a steady and uniform manner and in a counter clockwise direction as viewed in Figure 1 of the drawings. Whole fruit, such as freestone peaches which have been roughly graded as to size is supplied to an operator standing in front of the machine. As a pair of splitting and spreader blades 54—56 approaches the fruit support 240, the operator places a piece of fruit upon fruit support 240. The suture plane is positioned vertically and the stem indent of the fruit is directed radially inwardly toward the center of conveyor 14 while the fruit is rested upon holder 240. During this portion of the operation holder 240 is stationary. When holder 240 begins to move upwardly the operator knows that the spreader and splitter blades 54—56 and the pit retaining member 16 are in position properly to receive fruit provided the height of fruit support 240 has been properly adjusted by means of the slot 272 and the stud 274 (see Figure 2 of the drawings). The operator then pushes the aligned fruit onto the splitter and spreader blades 54—56 after which the fruit is released by the operator and the fruit support 240 is moved downwardly to the position shown in Figures 1 and 3 from that shown in Figure 4 during which movement the operator picks up the next piece of fruit.

As the operator presses the fruit upon the blades 54—56 the cutting edges of the blades cut the fruit along the suture plane down to the pit and substantially half way through the fruit. This movement of the fruit onto the conveyor 14 is accomplished with maximum safety to the operator. The initial impaling of the fruit upon the spreader blades 54—56 also begins the spreading of the fruit flesh from the pit due to the divergence of the spreader blades toward the center of the conveyor.

As conveyor 14 continues to revolve with the splitter and spreader blades and the pit engaged by the pit receiving members 16, the fruit is carried in a counter clockwise direction as viewed in Figure 1. Another piece of fruit is impaled by the operator on the next set of divider and spreader blades which appear adjacent the fruit support 240. Eventually the fruit first impaled upon conveyor 14 has travelled through approximately an angle of something less than 180° and arrives at a point at which the second severing blade 112 is moved to the right as viewed in Figure 1 under the operation of the drive mechanism described above and operated from cam shaft 142. The sharpened edge 114 of blade 112 is moved toward the conveyor 14 and severs the remaining portion of the circumference of the skin of the fruit and further cleaves the flesh until the sharpened edge 114 touches the outwardly directed end of the pit or until the knife yoke 118 comes in contact with the stop 198. When blade 112 is in this position, the sharpened edge thereof is in close proximity to the periphery of conveyor 14 and the spreader blades 54—56 and is substantially concentric to the axis of the conveyor and the radius of curvature of the outer cutting edges of blades 54—56. If the pit is substantially larger than normal it may extend beyond the periphery of the cutting edges of the spreader blades 54 and 56 in which case blade 112 engages the end of the pit and the spring 196 yields thereby permitting blade 112 to stop while the actuating mechanism therefor continues to move to the full cutting position.

The presser pads 124 are then swung until they engage the outwardly extending end of the fruit flesh and are held in this position during the spreading of the outer ends of the spreader blades 54 and 56. The driving mechanism for presser pads 124 is such as to accommodate varying sizes of peaches through the yieldability of spring 224 (see Figure 6).

When the pads 124 have reached the forwardmost position as viewed in Figure 1 the rollers 164 attached to the mount for spreader blades 54 and 56 engage the opening cams 162 whereby to move the outer ends of the spreader blades 54 and 56 to the opened or spread position whereby to separate the flesh of the fruit from the pit. During the spreading of blades 54 and 56, the pit is retained by the prongs 48 against lateral movement thereby permitting ready separation of the flesh from the pit. The spreader blades are held in the open position by cams 170 during the discharge of the fruit halves and the pit from the machine. Blades 54 and 56 are moved to the closed position shortly before they rise above fruit support 240.

It will be seen that there has been provided a machine which fulfills all of the objects and advantages set forth above. The fruit support 240 permits rapid and accurate feeding of fruit to the machine and further provides a positive guide during impaling of the fruit upon the splitting and spreader blades. Increased safety is realized due to the use of fruit support 240 and the plate 300.

Although a preferred embodiment of the invention has been set forth for purposes of illustration, it is to be understood that various changes and modifications can be made therein without departing from the spirit and scope of the invention. Accordingly, the invention is to be limited only as set forth in the following claims.

I claim:

1. In a machine for processing fruit of the freestone type, a fruit conveyor having fruit impaling means providing a pit pocket, drive mechanism connected to said conveyor continuously to rotate said conveyor, a fruit support mounted adjacent said conveyor and spaced therefrom in position to align fruit positioned thereon with said fruit impaling means, and drive mechanism connected to said fruit support to move said fruit support along a path parallel to the path of said pit pocket and in synchronism with said conveyor in the same direction as said conveyor and adjacent said fruit impaling means, whereby the pit of fruit positioned on said fruit support is in alignment with said pit pocket.

2. In a machine for processing fruit of the freestone type, a fruit conveyor having fruit impaling means providing a pit pocket, drive mechanism connected to said conveyor continuously to rotate said conveyor, a V-shaped fruit support including a pair of angularly disposed support members mounted adjacent said conveyor and spaced therefrom, the junction of said support members being disposed in alignment with said conveyor whereby fruit positioned upon said fruit support is guided toward said pit pocket, and drive mechanism connected to said fruit support to move said fruit support in a path concentric with the path of said pit pocket and in synchronism with said conveyor in the same direction as said conveyor and adjacent said fruit impaling means whereby the pit of the fruit positioned on said fruit support is in alignment with said pit pocket.

3. In a machine for processing fruit of the freestone type, a fruit conveyor having fruit impaling means providing a pit pocket, drive mechanism connected to said conveyor continuously to rotate said conveyor, a fruit support mounted adjacent said conveyor and in position to align fruit positioned thereon with said fruit impaling means, means pivotally mounting said fruit support for oscillating movement adjacent said fruit conveyor, and drive mechanism connected to said fruit support to move said fruit support in synchronism with said conveyor in the same direction therewith during a portion of the movement thereof, said fruit support during said portion of movement being positioned with respect to said fruit impaling means whereby the pit of fruit positioned on said fruit support is in alignment with said pit pocket.

4. In a machine for processing fruit of the freestone type, a fruit conveyor having fruit impaling means providing a pit pocket, drive mechanism connected to said conveyor continuously to rotate said conveyor, a fruit support mounted adjacent said conveyor and in position to align fruit positioned thereon with said fruit impaling means, means pivotally mounting said fruit support for oscillating movement adjacent said fruit conveyor, and drive mechanism connected to said fruit support to move said fruit support in synchronism with said conveyor in the same direction therewith during a portion of the movement thereof, said fruit support during said portion of movement being positioned with respect to said fruit impaling means whereby the pit of fruit positioned on said fruit support is in alignment with said pit pocket, the position of said fruit support with respect to said fruit impaling means during said portion of movement being adjustable to accommodate different sizes of fruit.

5. In a machine for processing fruit of the freestone type, a fruit conveyor having fruit impaling means providing a pit pocket, drive mechanism connected to said conveyor continuously to rotate said conveyor, a fruit support mounted adjacent said conveyor and in position to align fruit positioned thereon with said fruit impaling means, said fruit support having a rest position, and drive mechanism connected to said fruit support to move said fruit support in synchronism with said conveyor in the same direction as said conveyor and adjacent said fruit impaling means along a predetermined path and thereafter to return said fruit support to said rest position, the pit of a fruit positioned on said fruit support being in alignment with said pit pocket while said fruit support is moving in the same direction as said conveyor.

6. In a machine for processing fruit of the freestone type, a fruit conveyor having fruit impaling means providing a pit pocket, drive mechanism connected to said conveyor continuously to rotate said conveyor, a fruit support mounted adjacent said conveyor and in position to align fruit positioned thereon with said fruit impaling means, said fruit supporting having a rest position, drive mechanism connected to said fruit support to move said fruit support in synchronism with said conveyor in the same direction as said conveyor and adjacent said fruit impaling means along a predetermined path and thereafter to return said fruit support to said rest position, the pit of a fruit positioned on said fruit support being in alignment with said pit pocket while said fruit support is moving in the same direction as said conveyor, and a bumper mounted adjacent the rest position of said fruit support to be contacted thereby.

7. In a machine for processing fruit of the freestone type, a fruit conveyor having fruit impaling means providing a pit pocket, drive mechanism connected to said conveyor continuously to rotate said conveyor, a fruit support mounted adjacent said conveyor and in position to align fruit positioned thereon with said fruit impaling means, said fruit support having a rest position, drive mechanism connected to said fruit support to move said fruit support in synchronism with said conveyor in the same direction as said conveyor and adjacent said fruit impaling means along a predetermined path and thereafter to return said fruit support to said rest position, the pit of a fruit positioned on said fruit support being in alignment with said pit pocket while said fruit support is moving in the same direction as said conveyor, and means to adjust the position of said fruit support with respect to said pit pocket during travel of said fruit support along said predetermined path to accommodate different sizes of fruit.

8. In a machine for processing fruit of the freestone type, a rotatable fruit conveyor disc, a pair of spreader blades mounted upon said disc and providing a pit pocket, said spreader blades including sharp free edges forming the pit pocket and providing fruit impaling means, a fruit support mounted adjacent the periphery of said disc and spaced therefrom and in alignment with the plane thereof, drive mechanism connected to said conveyor disc to rotate said disc in a continuous manner, and drive mechanism connected to said fruit support to move said fruit support along a path spaced a constant distance from the path of said pit pocket and in the same direction and at the same angular rate as said conveyor disc with said pit pocket in alignment with the pit of a fruit positioned upon said fruit support.

9. In a machine for processing fruit of the freestone type, a rotatable fruit conveyor disc, a pair of spreader blades mounted upon said disc and providing a pit pocket, said spreader blades including sharp free edges forming a pit pocket and providing fruit impaling means, a fruit support mounted adjacent the periphery of said disc and spaced therefrom for movement in a path concentric with the path of said pit pocket, drive mechanism connected to said conveyor disc to rotate said disc in a continuous manner, and drive mechanism connected to said fruit support to move said fruit support in the same direction and at the same angular rate as said conveyor disc with said pit pocket in alignment with the pit of a fruit positioned upon said fruit support.

10. In a machine for processing fruit of the freestone type, a rotatable fruit conveyor disc, a pair of spreader blades mounted upon said disc and providing a pit pocket, a V-shaped fruit support including a pair of angularly disposed support members, mounting means for said fruit support to mount said fruit support to swing about an axis concentric with the path of said pit pocket and spaced from said disc, the junction of said support members being disposed in alignment with said conveyor disc whereby fruit positioned upon said fruit support is guided toward said pit pocket and being arranged to move fruit under the influence of gravity toward said pit pocket, and drive mechanism interconnecting said fruit support and said conveyor disc to move said fruit support in synchronism with said conveyor disc in the same direction as said conveyor disc and adjacent said pit pocket whereby the pit of fruit positioned on said fruit support is in alignment with said pit pocket.

11. In a machine for processing fruit of the freestone type, a rotatable fruit conveyor disc, a pair of spreader blades mounted upon said disc and providing a pit pocket, drive mechanism connected to said conveyor disc continuously to rotate said conveyor disc, a fruit support mounted adjacent said conveyor disc and in position to align fruit positioned thereon with said pit pocket, means pivotally mounting said fruit support for oscillating movement along a curved path concentric with said conveyor disc, said fruit support having a rest position disposed substantially on a horizontal line passing through the center of rotation of said conveyor disc, drive mechanism connected to said fruit support to move said fruit support in synchronism with said conveyor disc upwardly in the same direction as said conveyor disc and adjacent said pit pocket along a predetermined path and thereafter to return said fruit support to said rest position, the pit of a fruit positioned on said fruit support being in alignment with said pit pocket while said fruit support is moving in the same direction as said conveyor disc.

12. In a machine for processing fruit of the freestone type including a rotatable fruit conveyor disc having a pit pocket provided thereon and provided wtih drive means continuously to rotate the disc, a fruit support mounted adjacent the periphery of the disc and spaced therefrom for movement in a path adjacent the disc and parallel to the path of said pit pocket, and drive mechanism interconnecting said fruit support and said disc to move said fruit support in the same direction as the disc and at the same angular rate as the disc with the pit of a fruit positioned on said fruit support in alignment with the pit pocket on the conveyor disc.

13. In a machine for processing fruit of the freestone type including a rotatable fruit conveyor disc having a pit pocket provided thereon and provided with drive means continuously to rotate the disc, a V-shaped support including a pair of angularly disposed support members mounted adjacent the conveyor disc, the junction of said support members being disposed in alignment with the conveyor disc and spaced therefrom whereby fruit positioned upon said fruit support is guided toward the pit pocket, and drive mechanism interconnecting said fruit support and said conveyor disc to move said fruit support in a path concentric with the path of said pit pocket and in synchronism with the conveyor disc in the same direction as the conveyor disc and adjacent the pit pocket whereby the pit of fruit positioned on said fruit support is in alignment with the pit pocket.

14. In a machine for processing fruit of the freestone type including a rotatable fruit conveyor disc having a pit pocket provided thereon and provided with drive mechanism connected thereto continuously to rotate the disc, a fruit support mounted adjacent the disc and having a rest position in general horizontal alignment with the center of rotation of the disc, and drive mechanism connected to said fruit support to move said fruit support arcuately upwardly in synchronism with the disc in the same direction as the disc and adjacent the pit pocket along a predetermined path and thereafter to return said fruit support arcuately downwardly to said rest position, the pit of a fruit positioned on said fruit support being in alignment with the pit pocket while said fruit support is moving in the same direction as the disc.

15. In a machine for processing fruit of the freestone type including a rotatable fruit conveyor disc having a pit pocket provided thereon and provided with drive mechanism connected thereto continuously to rotate the disc, a fruit support mounted adjacent the disc and having a rest position in general horizontal alignment with the center of rotation of the disc, drive mechanism connected to said fruit support to move said fruit support arcuately upwardly in synchronism with the disc in the same direction as the disc and adjacent the pit pocket along a predetermined path and thereafter to return said fruit support arcuately downwardly to said rest position, the pit of a fruit positioned on said fruit support being in alignment with the pit pocket while said fruit support is moving in the same direction as the disc, and means to adjust the position of said fruit support with respect to the pit pocket during movement of said fruit support along said predetermined path to accommodate different sizes of fruit.

16. In a machine for processing fruit of the freestone type including a rotatable fruit conveyor disc having a pit pocket provided thereon and provided with drive mechanism connected therewith continuously to rotate the disc, a fruit support mounted adjacent the disc and having a rest position in general horizontal alignment with the center of rotation of the disc, drive mechanism connected to said fruit support to move said fruit support arcuately upwardly in synchronism with the disc in the same direction as the disc and adjacent the pit pocket along a predetermined path and thereafter to return said fruit support arcuately downwardly to said rest position, the pit of a fruit positioned on said fruit support being in alignment with the pit pocket while said fruit support is moving in the same direction as the disc, and a bumper mounted beneath the rest position of said fruit support to contact said fruit support in the rest position.

17. In a machine for processing fruit of the freestone type, a rotatable fruit conveyor disc having a plurality of pit pockets spaced around the periphery thereof, drive mechanism connected to said disc continuously to rotate said disc, a fruit support mounted adjacent said disc and in position to align fruit positioned thereon with said pit pockets, means pivotally mounting said fruit support for oscillating movement along a curved path concentric with said disc, said fruit support having a rest position disposed substantially on a horizontal line passing through the center of rotation of said disc, drive mechanism connected to said fruit support to move said fruit support in synchronism with said disc arcuately upwardly in the same direction as said disc and adjacent one of said pit pockets and thereafter to return said fruit support to said rest position, said fruit support moving means thereafter moving said fruit support in synchronism with said disc and in alignment with the next adjacent pit pocket, the pit of a fruit positioned on said fruit support being in alignment with the adjacent pit pocket while said fruit support is moving in the same direction as said disc.

References Cited in the file of this patent
UNITED STATES PATENTS

| | | |
|---|---|---|
| 596,343 | Topp | Dec. 28, 1897 |
| 921,523 | Dunkley | May 11, 1909 |
| 1,754,636 | McCollom | Apr. 15, 1930 |
| 2,474,492 | Perrelli et al. | June 28, 1949 |
| 2,588,575 | Rollins | Mar. 11, 1952 |
| 2,704,561 | Thompson | Mar. 22, 1955 |